United States Patent
Wood et al.

(10) Patent No.: US 6,746,055 B1
(45) Date of Patent: Jun. 8, 2004

(54) TRANSITION COUPLING BETWEEN METAL AND PLASTIC PIPING SYSTEMS

(75) Inventors: Tim F. Wood, Owasso, OK (US); Mike Clark, Muskogee, OK (US)

(73) Assignee: Continental Industries, Inc., Tulsa, OK (US)

( * ) Notice: Subject to any disclaimer, the term of this patent is extended or adjusted under 35 U.S.C. 154(b) by 0 days.

(21) Appl. No.: 10/209,543

(22) Filed: Jul. 31, 2002

Related U.S. Application Data (60) Provisional application No. 60/309,225, filed on Aug. 1, 2001.

(51) Int. Cl.[7] .................................................. F16L 33/00
(52) U.S. Cl. ..................... 285/249; 285/255; 285/222.1
(58) Field of Search .......................... 137/318; 285/255, 285/249, 222.1–222.5, 272, 148.15

(56) References Cited

U.S. PATENT DOCUMENTS

| | | | | |
|---|---|---|---|---|
| 2,374,225 A | * | 4/1945 | Melsom | 285/222.4 |
| 2,479,499 A | * | 8/1949 | Le Clair | 285/256 |
| 3,726,547 A | * | 4/1973 | Cox, Jr. | 285/149.1 |
| 3,814,466 A | * | 6/1974 | Leopold, Jr. | 285/55 |
| 4,062,572 A | * | 12/1977 | Davis | 285/249 |
| 4,220,359 A | * | 9/1980 | Evenson et al. | 285/249 |
| 4,256,335 A | * | 3/1981 | Nielsen, Jr. | 285/250 |
| 4,399,829 A | * | 8/1983 | Schuler | 137/15.14 |
| 4,955,406 A | * | 9/1990 | Antoniello | 285/198 |
| 5,112,087 A | * | 5/1992 | Haruki | 285/255 |
| 5,121,949 A | * | 6/1992 | Reese | 285/255 |
| 5,366,260 A | | 11/1994 | Wartluft | 285/323 |
| 5,692,785 A | | 12/1997 | Wartluft et al. | 285/328 |
| 5,791,698 A | | 8/1998 | Wartluft et al. | 285/328 |
| 5,988,702 A | * | 11/1999 | Sas-Jaworsky | 285/222.1 |

* cited by examiner

*Primary Examiner*—David Bochna
(74) *Attorney, Agent, or Firm*—Head, Johnson & Kachigian (57) ABSTRACT

A coupling for a transition between a plastic pipe and a metal piping system. In one embodiment, the transition coupling includes an adapter nut having a first end for connection with the metal piping system. A stiffener tube, affixed in the adapter nut, has an external diameter less than an internal diameter of the plastic pipe. An adapter coupling is connected to a second end of the adapter nut. A hollow gripper is positioned within the adapter coupling having an internal circumferential surface configured to grippingly engage the plastic pipe after axial insertion. At least one toroidal elastomeric seal is received over a groove in the stiffener tube to engage the plastic pipe.

17 Claims, 6 Drawing Sheets

TRANSITION COUPLING BETWEEN METAL AND PLASTIC PIPING SYSTEMS

CROSS-REFERENCED TO RELATED APPLICATIONS

Priority is claimed from provisional application U.S. Ser. No. 60/309,225 filed on Aug. 1, 2001, and incorporated by reference herein.

BACKGROUND OF THE INVENTION

1. Field of the Invention

The present invention is directed to a transition joint or coupling for a fluid delivery system wherein a transition is made between a plastic and a metal pipe or piping system.

2. Prior Art

The present transition joint coupling is a "stab-type" or "gripper-type" coupler wherein the plastic pipe may be inserted in an axial direction manually into the pre-assembled coupler which is then tightened with a wrench. The gripper-type coupler serves to form a sealed, leak-proof communication which may be installed in the field with simple tools. Gripper-type couplers are common in the prior art and consist generally of an adapter nut having a passageway therethrough, a first end with external threads and an opposed, second end having internal threads. The adapter nut typically includes a recess having a shoulder which will receive a rigid metal stiffener tube. A hollow gripper having a frusto-conical external surface is positioned within a recess in an adapter coupling. The gripper has an internal circumferential surface configured to grippingly engage the plastic pipe and an elastomeric compression ring which seals with the outside surface of the plastic pipe. As the adapter coupling is tightened the gripper digs into the plastic pipe and the compression ring seals the outside surface of the plastic pipe.

Experience by users of the gripper-type couplings that exist in the prior art has shown that nicks or cuts in the outer surface of the plastic pipe may adversely affect the seal between the coupling and the outer surface of the plastic pipe. This is an obvious disadvantage to the product found in the prior art. The present invention provides a gripper coupling having a mechanism to provide a leak-proof seal with the interior surface of the plastic pipe. Examples of gripper-type couplings as exist in the prior art may be seen in the 1996 Continental Industries Catalog, Page S4.1.1. Examples of pipe couplings that seal to the interior surface of the plastic pipe can be seen in assignee's patents such as U.S. Pat. Nos. 5,791,698 and 5,692,785 which cover stab-type couplers.

SUMMARY OF THE INVENTION

The present invention may be used in numerous applications involving various fluids such as but not limited to natural gas or water. In many applications today, natural gas is transported within a plastic pipe, such as polyethylene, while passing underground. The plastic pipe is lighter and easier to handle than metal and is not subject to corrosion. Various governmental and other regulations require that if a pipe goes above ground or goes within a building, the piping must be metal. In some cases, a transition will be made from plastic to metal piping. In other cases, the plastic pipe will be sheathed with a metal pipe.

Finally, in some applications, old metal piping systems must be repaired or replaced. As an alternative thereto, plastic piping may be inserted within the existing metal piping or "slip-lined". This avoids the requirement of digging a new trench.

It is, therefor, a principal object and purpose of the present invention to provide a transition joint or coupling to connect a metal piping system with a plastic piping system which forms a seal not with the exterior of the plastic pipe but instead with the inside diameter or surface of the plastic pipe.

In this respect, before explaining at least one embodiment of the invention in detail, it is to be understood that the invention is not limited in this application to the details of construction and to the arrangement so that the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore that the claims be regarded as including such equivalent constructions insofar as they do not depart from the spirit and scope of the present invention.

The present invention provides a transition joint or coupling between a plastic piping system and a metal piping system. In one embodiment for use as a service head adapter, the transition coupling includes an adapter nut having a passageway therethrough, a first end with external threads and an opposed, second end having internal threads. The adapter nut includes a recess having a shoulder which will receive a rigid stiffener tube which is positioned coaxially within the adapter nut. The rigid stiffener tube could be made out of metal, hard plastic or any other material having like properties. A portion of the rigid stiffener tube includes an external knurled cylindrical surface. An O-ring or toroidal elastomeric seal is inserted over a circumferential groove in the rigid stiffener tube. Additionally, an O-ring or toroidal elastomeric seal or seals are inserted over a groove or grooves in the rigid stiffener tube. The seals are not strictly limited to O-rings or toroidal elastomeric seals in a groove but could be molded in place or any other configuration or material designed to provide a seal with inside surface of the pipe.

A hollow gripper having a frusto-conical external surface is positioned within a recess in an adapter coupling. The gripper has an internal circumferential surface configured to grippingly engage the plastic pipe.

The adapter coupling has an opening therethrough and is connected to the adapter nut by external threads on the adapter coupling which mate with internal threads on the adapter nut.

The internal diameter of the plastic pipe fits over the exterior of the rigid stiffener tube and the O-ring seals form a fluid tight seal with the internal surface of the plastic pipe.

The external threads of the adapter nut will connect with the metal piping systems, such as a metal pipe, a shut-off valve or other component.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
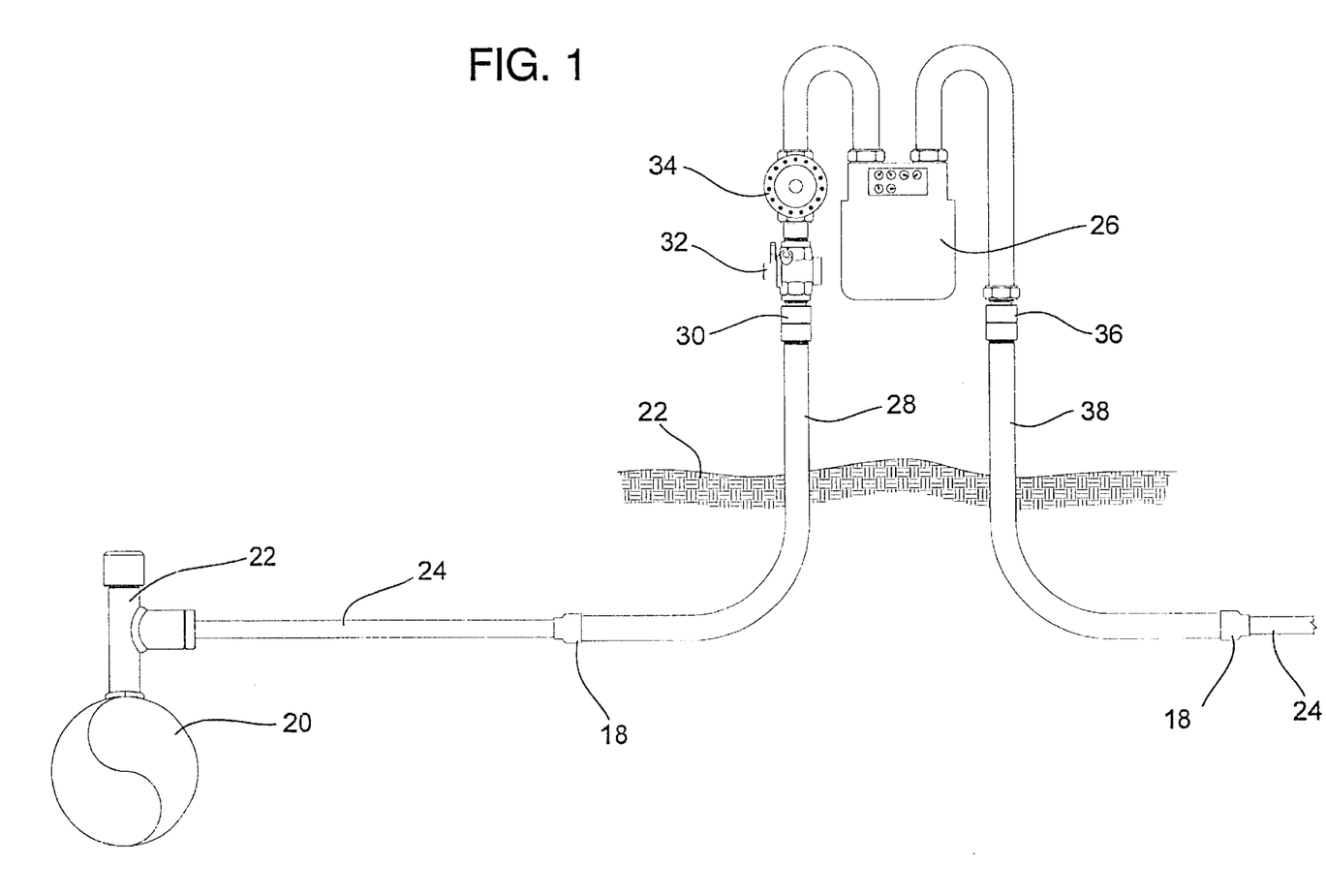
FIGS. 1 and 2 show typical configurations employing a transition coupling or couplings between metal piping systems and plastic piping systems.
Figure 2:
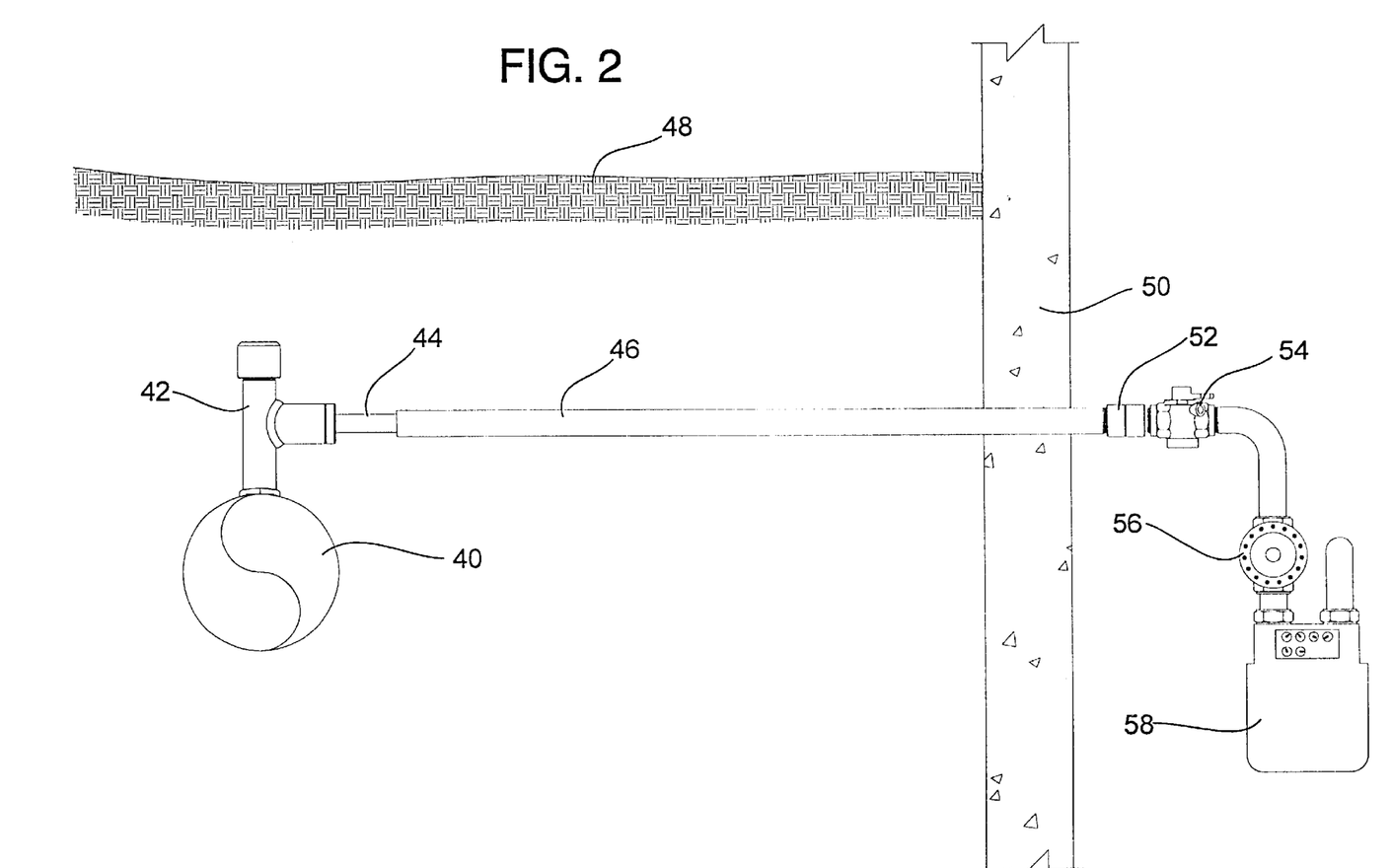

Referring to the drawings in detail, FIGS. 1 and 2 illustrate two different applications utilizing the teachings of the present invention.

FIG. 1 illustrates a service head adapter wherein a natural gas main 20 shown below ground level 21 is connected in fluid communication via a punch tee coupling 22 or other connection to a plastic pipe 24 which will allow fluid communication with the gas main 20. The punch tee coupling 22, to be described in detail herein, permits fluid connection with a metal pipe, such as a steel, gas main 20 and transitions to a plastic pipe 24, such as polyethylene, or other materials. In one application, the gas main 20 will serve a multitude of buildings or residences.

The plastic pipe 24 is buried in a trench and carries gas from the gas main to a building or residence (not shown). A gas meter 26 will be located above ground and is installed near the building or residence (not shown).

Prior to the plastic pipe 24 traveling above ground, a metal pipe is required. Accordingly, a rigid or a flexible metal riser 28 will be employed. The metal riser 28 will be connected with a transition coupling 30 for use as a service head adapter which is the subject of the present invention. The plastic pipe 24 resides within the metal riser 28 and a moisture cup 18 keeps dirt and moisture out. The metal riser 28 connects to the adapter coupling 82 of the transition coupling 30. The adapter nut 60 of the transition coupling 30 connects to the manual shut-off valve 32 a diaphragm 34 may also be installed in a pipe 33 leading up to the gas meter 26. Exiting the gas meter 26 will be an additional pipe 35 leading to the transition coupling 36 which is similar to transition coupling 30. A rigid or flexible metal riser 38 will return the line below ground level 21. The plastic pipe 24 resides within the metal riser 38. Finally, the plastic pipe 24 will be directed to the metered building or residence (not shown).

An alternate application of the present invention is shown in FIG. 2. A natural gas main 40 is shown in cross section. Extending perpendicularly from the gas main 40 is a metal punch tee coupling 42. The metal punch tee coupling 42 permits a transition from a metal piping system to a plastic piping system, such as plastic pipe 44.

In the arrangement shown in FIG. 2, an metal existing service line 46 is utilized. The plastic pipe 44 is inserted inside the existing metal service line 46.

The gas main 40, plastic pipe 44 and existing metal service line 46 are below ground level 48. When the natural gas service enters a basement or building, the line is required to be of metal. Accordingly, when the existing metal service line 46 passes through a basement wall 50, it incorporates the existing metal service line 46 enclosing the plastic pipe 44. The existing metal service line 46 is connected to a transition coupling 52 of the present invention to be described herein the transition coupling comprises an adapter coupling 51 and an adapter nut 53. Thereafter, a manual valve 54 and a diaphragm 56 may be employed leading up to the gas meter 58. The manual valve 54, diaphragm 56 and gas meter 58 are all known devices in the art.

While the embodiments herein are described with respect to natural gas delivery systems, it will be understood that the present invention may be applied to various fluid delivery systems.

FIGS. 3, 4, 5 and 6 illustrate transition couplings such as couplings 30 and 36 in FIG. 1 for use as a service head adapter. The transition coupling 30 includes an adapter nut 60 having a passageway therethrough and a first end 62 with external threads 63. An opposed, second end 64 includes internal threads 65. The external threads 63 of the first end 62 of the adapter nut 60 will threadably engage the metal parts of the service head adapter such as the manual shutoff valve 32 in FIG. 1.

The adapter nut 60 includes a recess 61 having a shoulder 66 which will receive a rigid stiffener tube 68. The rigid stiffener tube 68 is formed of metal, hard plastic, or any other material having sufficient strength and rigidity. A portion of the rigid stiffener tube 68 includes an external knurled surface 70. The external knurled surface 70 of the rigid stiffener tube 68 is friction fit into the recess 61 of the adapter nut 60.

Figure 5:
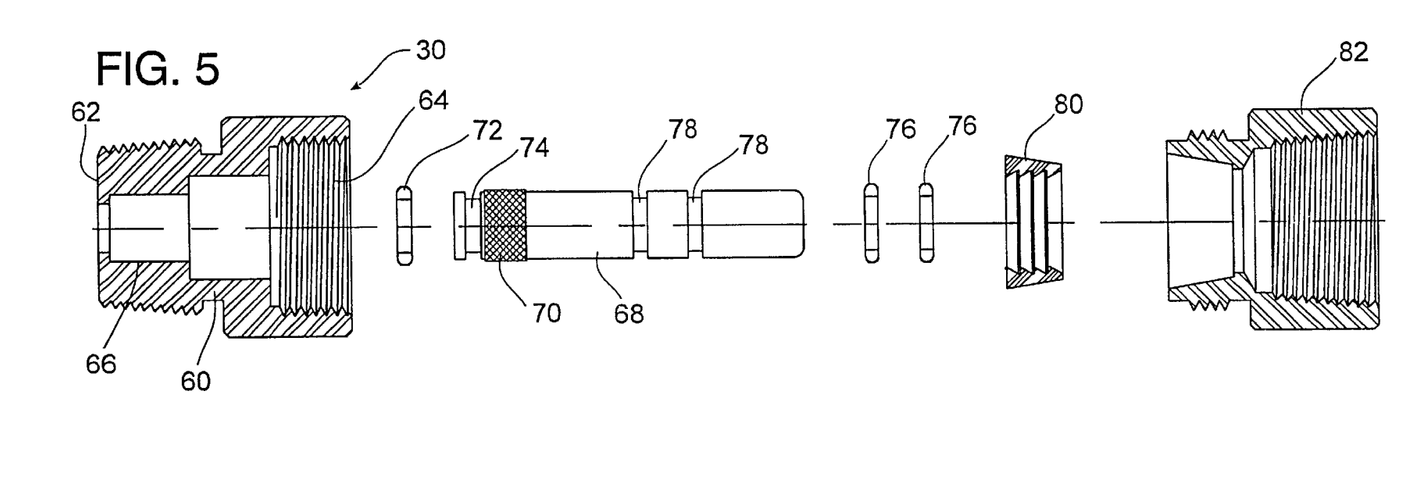
FIG. 5 illustrates a fully exploded, partial sectional view of a transition coupling shown in FIG. 3.
Figure 6:
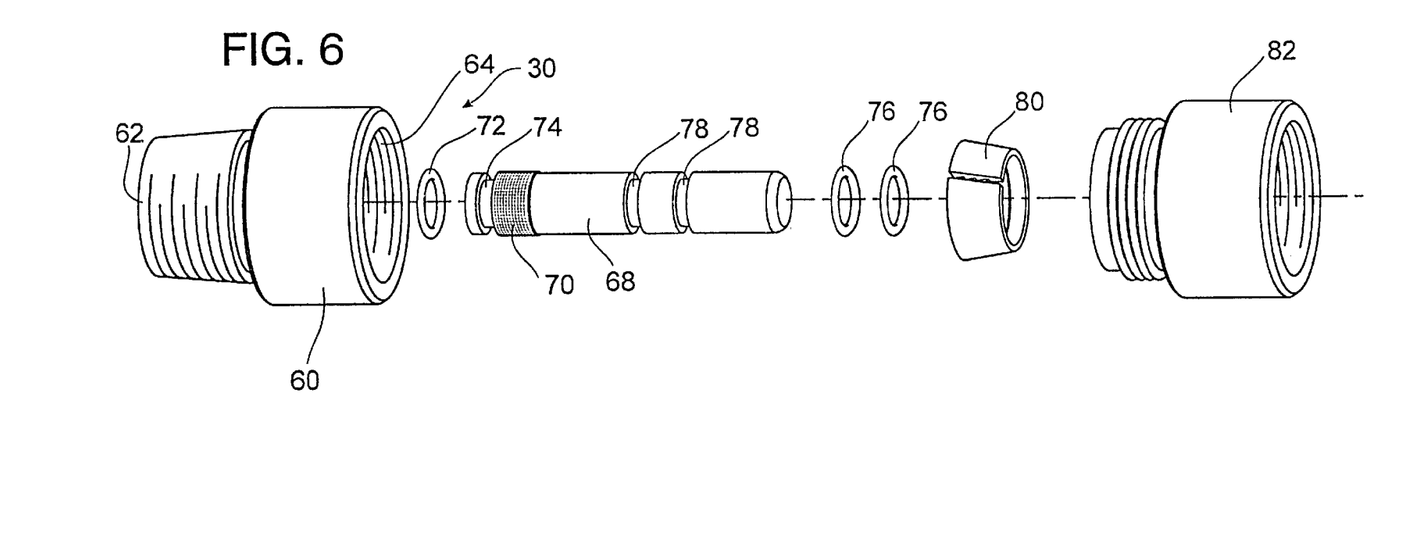
FIG. 6 illustrates a perspective, exploded view of a transition coupling as shown in FIG. 3.

FIGS. 5 and 6 illustrate the rigid stiffener tube 68 apart and exploded from the coupling 30. An O-ring or toroidal elastomeric seal 72 is inserted over a circumferential groove 74 in the rigid stiffener tube 68. Additionally, an O-ring or toroidal elastomeric seal or seals 76 are inserted over circumferential grooves 78 in the rigid stiffener tube 68.

Referring back to FIGS. 3 and 4. A hollow gripper 80 having a frusto-conical external surface fits and may be positioned within a recess 86 the adapter coupling 82. The gripper 80 has an internal circumferential surface 81 configured to grippingly engage the plastic pipe 24. The adapter coupling 82 has an opening 83 therethrough and is connected to the adapter nut 60. In the present embodiment, the adapter coupling 82 has a portion having external threads 87 which mate with the internal threads 65 of the adapter nut 60. The tighter the adapter coupling 82 is tightened in the adapter nut 60, the tighter the gripper 80 will engage the plastic pipe 24.

Figure 3:
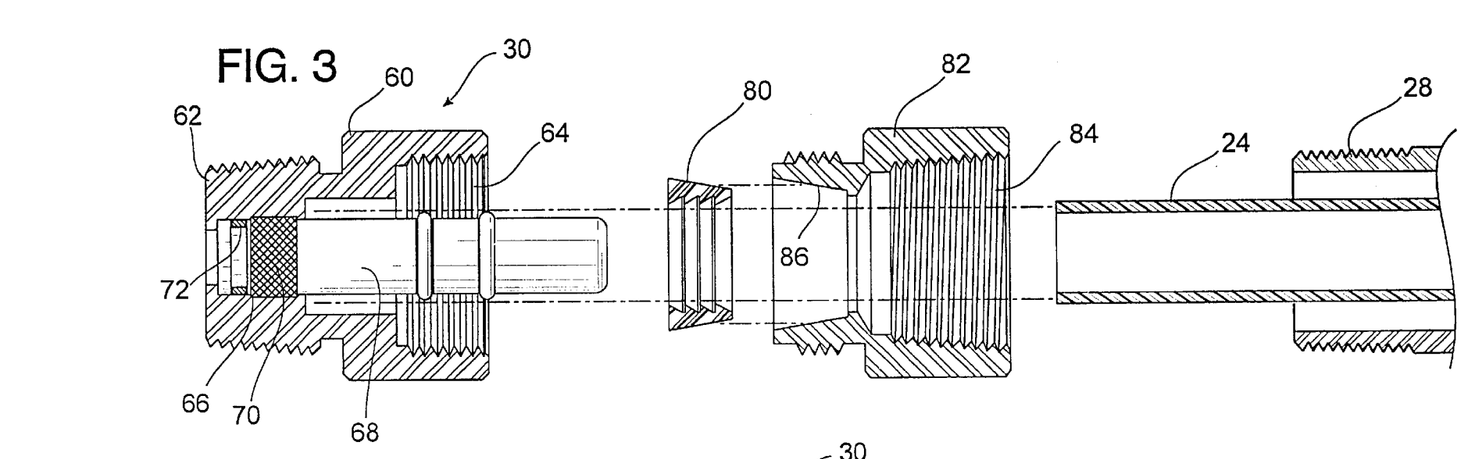
FIG. 3 shows a partially exploded, sectional view of a transition coupling constructed in accordance with the present invention.
Figure 4:
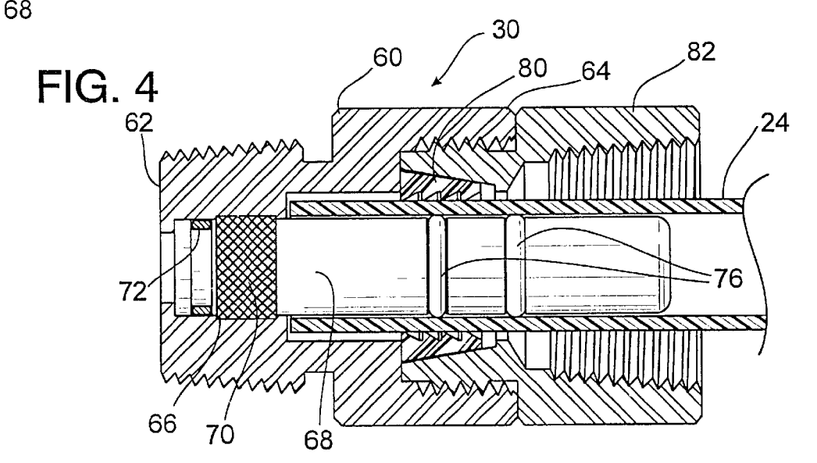
FIG. 4 shows a fully assembled cross-sectional view of a transition coupling shown in FIG. 3.

The plastic pipe 24 may be axially inserted through the opening 83 in the adapter coupling 82 and into the adapter nut 60. The internal surface 25 of the plastic pipe 24 fits over the rigid stiffener 68. Accordingly, the O-ring seal or seals 76 form a fluid-tight seal with the internal surface 25 of the plastic pipe 24.

After the plastic pipe 24 has been engaged with the transition coupling 30, the rigid or flexible metal riser 28 will be connected to the transition coupling 30 by internal threads 84.

Figure 7:
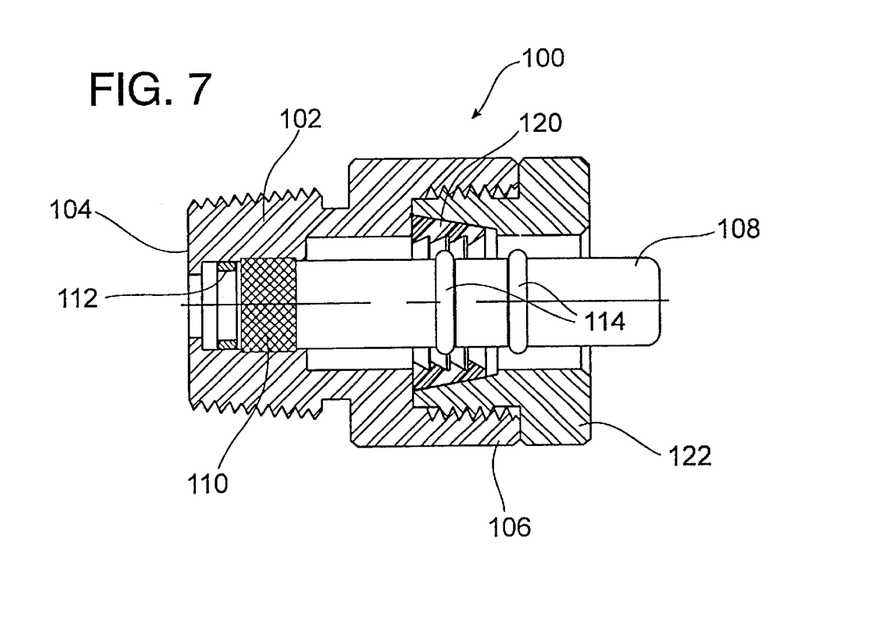
FIG. 7 illustrates a partial cross-sectional view of an alternate embodiment of a transition coupling constructed in accordance with the present invention.

FIG. 7 illustrates a partial sectional view of an alternate embodiment of the transition coupling 100. The transition coupling 100 will connect a plastic pipe (not shown) to a metal piping system (not shown). An adapter nut 102 has an opening 103 therethrough and a first end 104 with external threads 105. A second, opposed end 106 has internal threads 107.

Received within the adapter nut 102 is a rigid cylindrical stiffener tube 108, a portion of which includes a knurled external surface 110 which is friction fit into a recess 111 in the adapter nut 102. An O-ring or toroidal elastomeric seal 112 resides in a circumferential groove 113 in the rigid cylindrical stiffener tube 108. A pair of O-rings or toroidal elastomeric seals 114 are received in circumferential grooves 115 in the rigid cylindrical stiffener tube 108 to form a seal with the plastic pipe (not shown).

A hollow gripper 120 having an external frusto-conical surface is received within a recess 119 in an adapter coupling 122. The gripper 120 has an internal circumferential surface 121 configured to grippingly engage the plastic pipe (not shown).

The adapter coupling 122 has an opening 123 therethrough. The adapter coupling 122 has a portion with external threads 124 which mate with the internal threads 107 of the second end 106 of the adapter nut 102. Accordingly, a plastic pipe (not shown) may be inserted axially into the transition coupling 100 over the rigid stiffener tube 108 and the O-rings 114 to form a fluid tight seal with the interior surface of the plastic pipe (not shown). The adapter coupling 122 may be rotated to move the adapter coupling 122 axially and tighten the gripper 120 onto the plastic pipe (not shown).

Figure 8:
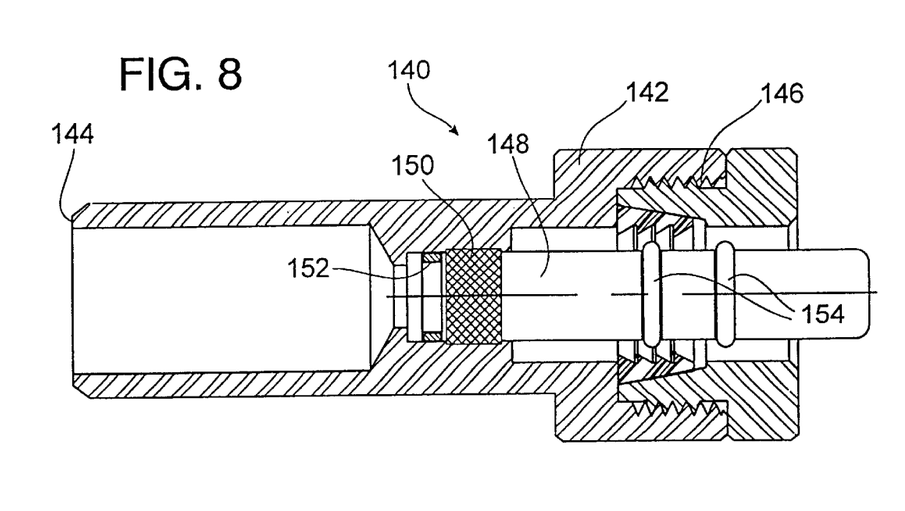
FIG. 8 illustrates a partial cross-sectional view of a further alternate embodiment of a transition coupling constructed in accordance with the present invention.

A further alternate embodiment of a transition coupling 140 of the present invention is shown in FIG. 8. The transition coupling 140 connects a plastic pipe (not shown) to a metal pipe (not shown). An adapter nut 142 has an opening 143 therethrough and a first end 144 with a face 145 that may be butt welded to a metal pipe (not shown). A second, opposed end 146 has internal threads 147.

Received within the adapter nut 142 is a rigid cylindrical stiffener tube 148 having a knurled external surface 150 which is friction fit into a recess 151 the adapter nut 142.

An O-ring or toroidal elastomeric seal 152 resides in a circumferential groove 153 in the rigid cylindrical stiffener tube 148. A pair of O-rings or toroidal elastomeric seals 154 are received in circumferential grooves 155 in the rigid cylindrical stiffener tube 148 to form a seal with the interior surface (not shown) plastic pipe (not shown).

Figures 9, 10:
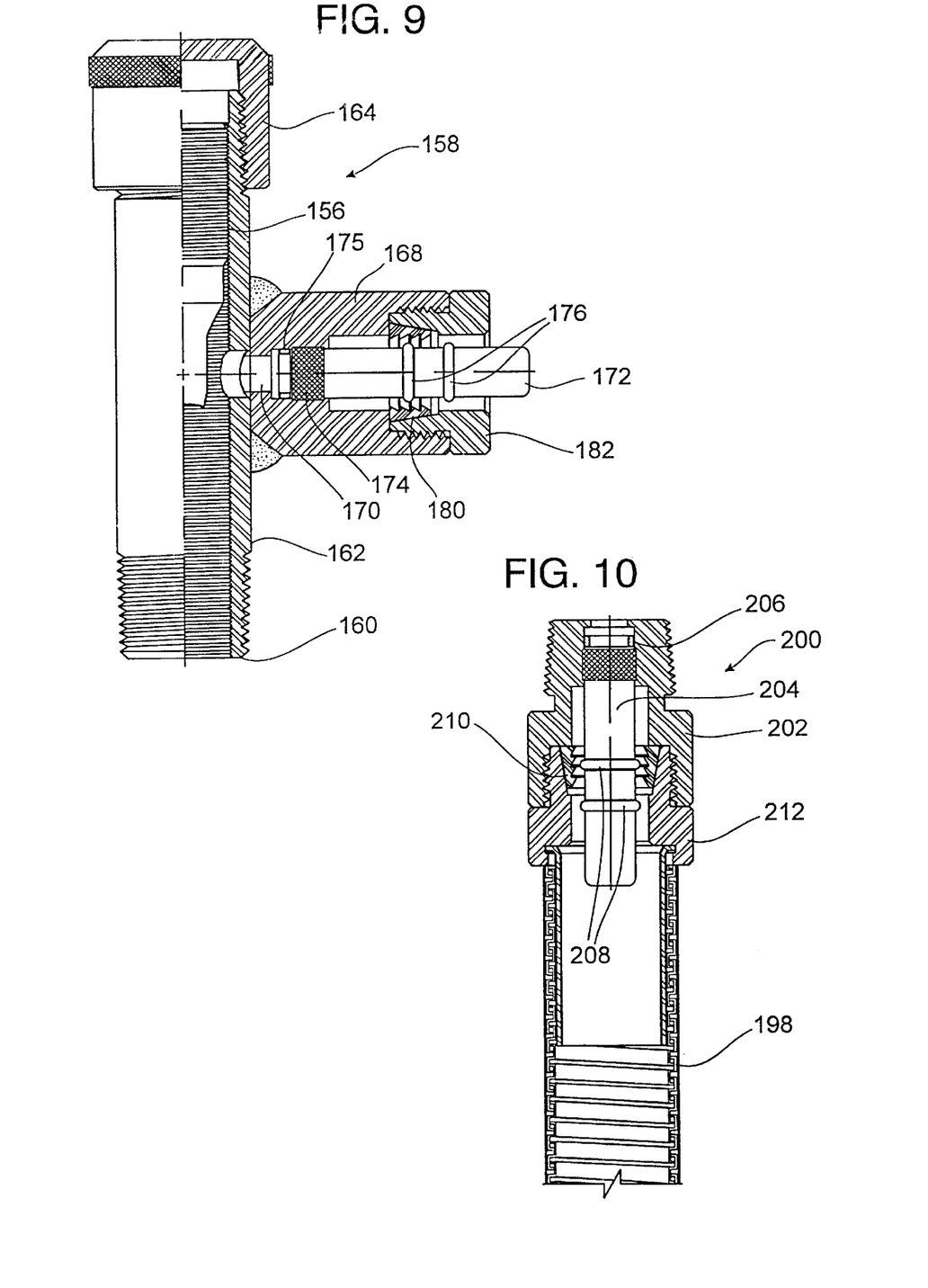
FIG. 9 illustrates a punch tee transition coupling constructed in accordance with the present invention.
FIG. 10 illustrates a further alternate embodiment of a transition coupling constructed in accordance with the present invention.

An additional, alternate embodiment of a transitional coupling 158 is shown in FIG. 9. In FIG. 9, a tee body 162 is threadably or otherwise connected to a main or other source (not shown) at a threaded first end 160. The tee body 162 may have a pipe cap 164 which is threaded on a threaded second end 165. Within the tee body 162 is a punch cutter 156 having external threads 157 which may be used to cut an opening in the main or other source (not shown). The punch cutter 156 is rotated and moved axially by a hex drive or Allen key socket (not shown).

Extending perpendicularly from the tee body 162 is an adapter body 168 which is in fluid communication with the tee body 162 through an opening 170. The adapter body 168 has a recess 167 to receive a rigid cylindrical stiffener tube 172 with an external knurled surface 174 in order to friction fit the rigid cylindrical stiffener tube 172 within the adapter body 168.

An O-ring or toroidal elastomeric seal 175 is inserted over a circumferential groove 173 in the rigid cylindrical stiffener 172. A pair of O-ring or toroidal elastomeric seals 176 are inserted over grooves 177 in the rigid cylindrical stiffener tube 172.

A hollow gripper 180 having a frusto-conical external surface fits within a recess 179 in an adapter coupling 182. The gripper 180 has an internal circumferential surface 181 configured to grippingly engage the plastic pipe (not shown). The adapter coupling 182 has external threads 183 which mate with internal threads 169 of the adapter body 168. The adapter coupling 182 may be rotated to move the adapter coupling 182 axially and tighten the gripper 180 onto the plastic pipe (not shown).

The plastic pipe (not shown) may be inserted axially through an opening 188 in the adapter coupling 182 and into the adapter body 168. The internal surface of the plastic pipe (not shown) fits over the rigid cylindrical stiffener tube 172. Accordingly, the seals 176 form a fluid tight seal with the internal surface (not shown) of the plastic pipe (not shown).

Finally, FIG. 10 shows a further, alternate embodiment of a transition coupling 200 of the present invention wherein a metal piping system (not shown) may be connected to a plastic pipe (not shown which is sheaved by a flexible riser 198. The transition coupling 200 includes an adapter nut 202 having an opening 203 therethrough and a recess 201 to receive a rigid cylindrical stiffener tube 204. A portion of the rigid cylindrical stiffener tube 204 has an external knurled surface 205 which is friction fit in the recess 201 in the adapter nut 202. An O-ring or toroidal elastomeric seal 206 resides in a circumferential groove 207 in the rigid cylindrical stiffener tube 204. A pair of O-rings or toroidal elastomeric seals 208 are received in circumferential grooves 209 in the rigid cylindrical stiffener tube 204 to form a seal with the internal surface (not shown) of the plastic pipe (not shown).

A hollow gripper 214 having an external frusto-conical surface is received within a recess 215 in an adapter coupling 216. The gripper 214 has an internal circumferential surface 217 configured to grippingly engage the plastic pipe (not shown).

The adapter coupling 216 has an opening 213 therethrough and is connected to the adapter nut 202. The adapter coupling 216 has a first end 218 with external threads 219 which mates with internal threads 221 of the adapter nut 202. The second end 220 of the adapter coupling 216 has a circumferential groove 222 which receives a swivel sleeve 224. The swivel sleeve 224 is friction fit with the flexible riser 198.

Whereas, the present invention has been described in relation to the drawings attached hereto, it should be understood that other and further modifications, apart from those shown or suggested herein, may be made within the spirit and scope of this invention.

What is claimed is:

1. A transition coupling between a plastic pipe and a metal pipe system, which transition coupling comprises:
   an adapter nut having a first end for connection with said metal pipe and a second end;
   a stiffener tube fixed in said adapter nut, said stiffener tube having an external diameter slightly less than an internal diameter of said plastic pipe;

an adapter coupling connected to said second end of said adapter nut;

a hollow gripper positioned within said adapter coupling having an internal circumferential surface configured to grippingly engage said plastic pipe after axial insertion; and at least one toroidal elastomeric seal between said stiffener tube and said plastic pipe and having an external diameter slightly greater than an internal diameter of said plastic pipe such that it engages and forms a fluid tight seal between said stiffener tube and said plastic pipe wherein said at least one toroidal elastomeric seal engages said plastic pipe at substantially the same portion of said pipe engaged by said hollow gripper.

2. A transition coupling as set forth in claim 1 wherein said stiffener tube has an external knurled surface which may be friction fit to secure said tube in said adapter nut.

3. A transition coupling as set forth in claim 1 wherein said stiffener tube is coaxial with said adapter nut.

4. A transition coupling as set forth in claim 1 wherein said first end of adapter nut has external threads for said connection with internal threads of said metal piping system.

5. A transition coupling as set forth in claim 1 wherein said first end of said adapter nut has a face for butt welding to said metal pipe.

6. A transition coupling as set forth in claim 1 wherein said stiffener tube has an external circumferential groove and said elastomeric seal fits therein.

7. A transition coupling as set forth in claim 6 including two said elastomeric seals in two said grooves.

8. A transition coupling as set forth in claim 7 wherein said elastomeric seals form a fluid tight seal with the inside surface of said plastic pipe.

9. A transition coupling as set forth in claim 1 wherein said adapter nut connects to said adapter coupling via internal threads on said nut and external threads on said adapter coupling.

10. A transition coupling as set forth in claim 1 wherein said adapter coupling has internal threads for connection to a threaded metal sheath.

11. A transition coupling as set forth in claim 10 wherein said threaded metal sheath is a flexible riser or a rigid riser.

12. A transition coupling as set forth in claim 1 wherein said adapter coupling has an internal circumferential groove for receiving a swivel sleeve.

13. A transition coupling as set forth in claim 1 including an O-ring seal between said stiffener tube and said adapter nut for forming a fluid tight seal.

14. A transition coupling as set forth in claim 13 wherein said tee body includes a threaded punch cutter and a removable cap.

15. A transition coupling as set forth in claim 1 wherein said adapter nut is perpendicular to a metal tee body which is connected to said metal pipe.

16. A transition coupling as set forth in claim 1 wherein said metal pipe is composed of copper, brass, steel, bronze or composites.

17. A transition coupling as set forth in claim 1 wherein said stiffener tube forms a fluid tight seal with the inside surface of said plastic pipe.

* * * * *